April 4, 1961
R. D. GECKLER ET AL
2,977,755
METHOD AND MEANS FOR INITIATING THE
DECOMPOSITION OF PROPELLANT
IN A ROCKET MOTOR
Filed Oct. 20, 1947
2 Sheets-Sheet 1
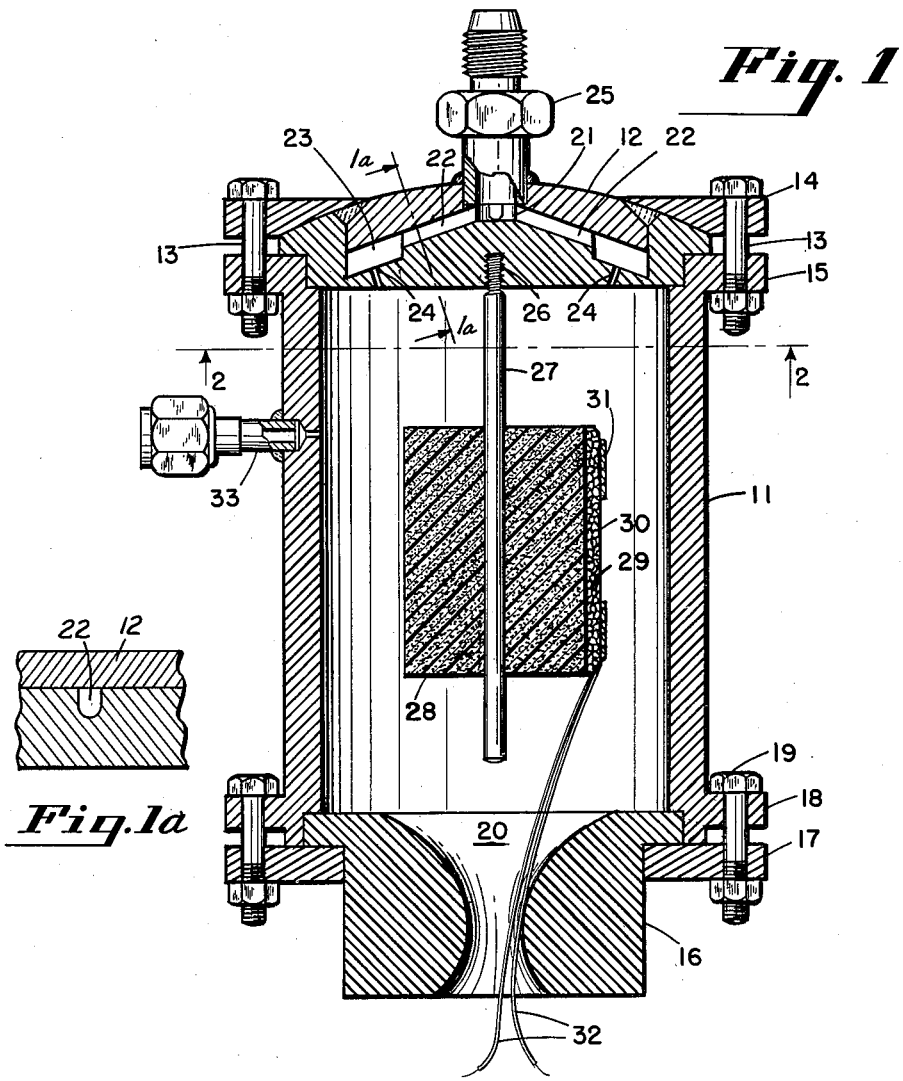
Fig. 1
Fig. 1a
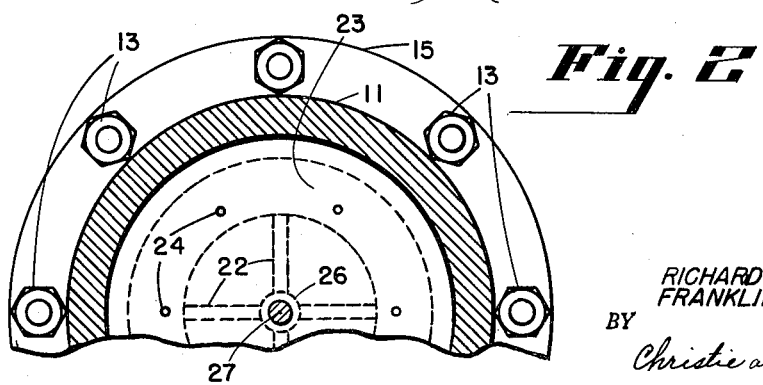
Fig. 2
INVENTOR.
RICHARD D. GECKLER
FRANKLIN R. HEPNER
BY Christie and Angus
ATTORNEYS April 4, 1961

R. D. GECKLER ET AL 2,977,755

METHOD AND MEANS FOR INITIATING THE
DECOMPOSITION OF PROPELLANT
IN A ROCKET MOTOR

Filed Oct. 20, 1947

INVENTOR.
RICHARD D. GECKLER
FRANKLIN R. HEPNER
BY
Christie and Angus
ATTORNEYS

United States Patent Office 2,977,755
Patented Apr. 4, 1961

2,977,755

METHOD AND MEANS FOR INITIATING THE DECOMPOSITION OF PROPELLANT IN A ROCKET MOTOR

Richard D. Geckler and Franklin R. Hepner, Pasadena, Calif., assignors, by mesne assignments, to Aerojet-General Corporation, Cincinnati, Ohio, a corporation of Ohio Filed Oct. 20, 1947, Ser. No. 780,966

6 Claims. (Cl. 60—35.6)

This invention relates to rocket motors and more particularly to means for igniting fluid propellant injected into the rocket motor.

The principal object of the invention is to provide a positive, dependable and safe device for initiating the decomposition or combustion of the propellant to start the motor into operation.

A liquid propellant rocket motor ordinarily comprises a reaction chamber having an exhaust nozzle and an injector means through which liquid propellant is injected into the chamber where it is ignited or decomposed thus forming gas in high volume which escapes through the exhaust nozzle at high velocity to produce the reaction thrust. Some propellants useful for operation in such rocket motors require ignition means to start the combustion or decomposition; and this may be true even in the case of propellants which are self-combustible. A typical example of a self-combustible liquid propellant useful in rocket motors is nitromethane which contains the oxygen required to decompose it. Nitromethane, however, does not spontaneously decompose at ordinary temperatures, and requires an elevated temperature to initiate the decomposition. After the decomposition has satisfactorily started, the high temperature in the chamber is sufficient to maintain the decomposition.

Heretofore, difficulty has been experienced in initiating the decomposition of the nitromethane, especially when it is introduced into a cold motor. It is desired that the decomposition shall be positively initiated just as soon as the nitromethane enters the combustion chamber, otherwise a considerable quantity of the nitromethane may be injected into the chamber before ignition occurs. In such cases, an accumulation of the liquid nitromethane will occur in the chamber, so that if ignition finally does occur it may produce a dangerously large initial pressure or explosion.

A number of expedients have theretofore been proposed for initiating the decomposition of the nitromethane injected into a rocket motor chamber. One such expedient has been the use of catalysts, which aid in initiating the decomposition; but the use of catalysts is not always as positive in the igniting action as is desirable; furthermore, they usually require some form of ignition means in addition to the catalyst itself.

Another expedient which has sometimes been used has been to introduce oxygen into the chamber with the nitromethane and then ignite it by some ignition means such as a spark plug. The use of oxygen however, requires some sort of storage equipment for the oxygen, involving some bulk which may be undesirable in some applications; and furthermore, the temperatures produced during decomposition when oxygen is used are sometimes higher than is desirable. If high temperatures continue too long, injury to the motor and injectors may result.

In accordance with our invention, we provide an improved device for initiating the decomposition of nitromethane and which insures the immediate initiation of the decomposition just as soon as the nitromethane enters the reaction chamber. This is accomplished in accordance with our invention by attaching a small charge of a solid self-combustible material within the reaction chamber which is adapted to be ignited; and when it is ignited, it generates sufficient heat and pressure within the chamber to insure the spontaneous decomposition of the nitromethane injected into the injector after the charge has started to burn.

For the solid propellant charge, we use a substance which is tenaciously adherent to a support and will hold its shape, and will not readily crack or split while burning. These features are desirable to prevent the charge from blowing off the support and into the nozzle, which would jam it and cause excessive pressures. The charge to be selected is furthermore a relatively slow-burning self-combustible substance which will burn at atmospheric pressure and yet will burn slowly when the pressure is greatly increased.

We have found that an especially desirable composition responding to these properties and qualities is ammonium perchlorate uniformly distributed in a matrix of synthetic alkyd resin.

A feature of the invention is the formation of a shape for the charge such that the gas generated will decrease at a desired rate after combustion is initiated. According to a related feature, this decrease of burning or gas generation rate of the ignited substance is correlated with the increase in gas generation due to the nitromethane after the latter enters the chamber and has its decomposition initiated. In this way, a fairly uniform gas pressure within the chamber may be maintained during the interim of time required to start the motor by use of the charge and up to a uniform operation involving the decomposition of the nitromethane as it enters the chamber.

The foregoing and other features of our invention will be better understood from the following detailed description and the accompanying drawings, of which:

Fig. 1 shows in cross-section a rocket motor provided with an igniting charge in accordance with our invention;

Fig. 1a is a cross-section view taken at line 1a—1a of Fig. 1, and shows a detail of the construction;

Fig. 2 shows a broken cross-section view taken at line 2—2 of Fig. 1;

Figure 3:
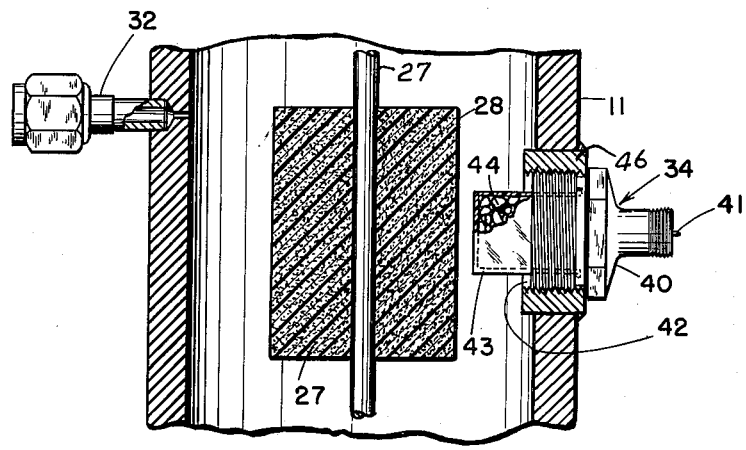
Fig. 3 is a partial view in cross-section showing the central portion of a reaction motor and charge according to our invention which is modified somewhat from the arrangement shown in Fig. 1 by the position of an ignitor.

Referring to Figs. 1 and 2, there is shown a rocket motor designed to be operated by a liquid propellant injected into the chamber, and especially for operation by nitromethane. The motor comprises a combustion chamber 11, ordinarily of metal and preferably cylindrical in shape. One end of the reaction chamber 11 is provided with a closure cap 12 which is held in place by an annular ring 14 having its lower surface shaped to conform with the top outline of cap 12. Ring 14 is secured to an annular shoulder 15 located at the upper end of the reaction chamber 11 by a plurality of bolts 13.

The opposite end of the reaction chamber 11 is provided with a nozzle member 16 held securely in place by a retainer ring 17 which is attached to a flange 18 located at the lower end of reaction chamber 11 by a plurality of bolts 19. Nozzle member 16 is preferably provided with a converging-diverging orifice 20 of the De Laval type.

One embodiment of closure member 12 has a centrally located cylindrical depression 21 extending a substantial distance down from the upper surface in the direction of the longitudinal axis. The upper portion of cylindrical depression 21 is enlarged for a sufficient depth to permit the insertion of a fitting 25 which is then permanently secured to closure member 12 by welding, brazing, or other suitable means. A plurality of channels 22 radiate outwardly from cylindrical depression 21, these channels being shown for convenience as U-shaped grooves; however, some other suitable configurations would serve. The outer ends of channels 22 terminate in an annular groove 23 which is symmetrical with respect to the longitudinal axis of member 12; and a series of injector orifices 24 open into the reaction chamber 11 from annular groove 23. The axes of the orifices 24 are positioned at an angle with the longitudinal axis of closure member 12 so that the streams from the injectors will intersect at a predetermined point within the reaction chamber. The closure member described above is used as an example and any other suitable closure member injector arrangement may be substituted for the above if desired.

The face of closure member 12 opposite to the one to which fitting 25 is attached is provided with a threaded hole 26 preferably centrally positioned which receives a stud 27. The stud is preferably made of some metal or alloy having a high heat resistance such as molybdenum to avoid having it melt at the high temperatures generally existing in the reaction chamber when the motor is in operation.

A slow-burning, self-combustible charge 28 is cast around stud 27. The preferred composition for this self-combustible charge is a mixture of ammonium perchlorate in a styrene-modified thermosetting alkyd resin. It contains sufficient oxygen to maintain itself in a state of combustion after it is ignited, without the addition of oxygen from an outside source. Such compositions have been heretofore disclosed and claimed in application Serial No. 647,189 by Roberts, filed February 12, 1946. This composition for the self-combustible charge is given as an example only, and it will be understood that some other slow-burning, self-combustible, easily ignited mixture, having the desired physical properties, may be substituted in its place.

The burning of this self-combustible charge is initiated by squib 29 preferably made of large black powder grains contained in a self-combustible envelope or container 30. This loaded container is attached to the side of charge 28 by means of strips 31 of adhesive tape or similar material as shown in Fig. 1. An electrical ignition means such as a hot wire is embedded in the black powder grains and is connected in series between the ends of wires 32 which enter the reaction chamber through nozzles 19.

A pressure tap 33 is located at a suitable position of the wall of the reaction chamber 11 and is provided with a suitable coupling means for a purpose to be described hereinafter.

The illustration in Fig. 1 shows a single self-combustible charge 28 within the reaction chamber. In motors which are considerably larger in size it has been found expedient to employ a plurality of these charges 28 which are located at different positions in the reaction chamber to insure uniform heating of all portions of the chamber.

The motor described in Fig. 1 is suitable for use in a standard rocket installation, however, if it is desired to employ this type of motor as a gas generator, such as for example, to develop power for driving a gas turbine it is preferable to employ a different ignitor assembly to initiate the combustion of self-combustible charge 28. The metal wires which conduct the current used in setting off the powder charge in Fig. 1 would soon be melted by the heat and metal particles would be thrown against the turbine blades resulting in possible injury thereto.

Fig. 3 shows, by way of example, an assembly suitable for use in a gas generator. This comprises an ignitor boss 46 secured to the wall of reaction chamber 11 by welding or other suitable means and provided with threads into which may be inserted a conventional black powder ignitor 34 of the type described in application Serial No. 607,688, by Fred S. Miller et al., filed July 30, 1945, now Patent No. 2,561,670. Briefly, this ignitor comprises a plug member 40 threaded within the boss and provided with an internal recess closed at its inner end by a frangible disc such as cardboard or the like. The space forming this recess between the inner wall of plug 40 and the frangible disc is filled with an ignitable substance such as black powder through which there is extended a suitable hot-wire type ignition wire, the ends of which are brought out through electrical leads 41 which connect with a suitable ignition battery or the like. The inner portion of plug 40 forms a sleeve 42 within which there is inserted a tubular cartridge 43 of an ignitable material such as cellulose nitrate; and this cartridge is filled with pellets or particles 44 of an inflammable material, which for example, may consist of broken-up pieces of a same sort of composition as the propellant mass 28, or may be phenolformaldehyde-perchlorate mixtures or blasting powder in grains. When the ignitor is ignited by closing the electric circuit at the leads 41, the black powder is ignited and readily burns through the frangible disc containing it and igniting the pellets or particles 44 in the cartridge. The cartridge material likewise ignites and the burning pellets are spread over the surface of the ignitable mass 28, thereby providing effective ignition for it. This type of ignitor charge burns completely forming no solid particles which could cause injury to the turbine wheel.

Figure 4:
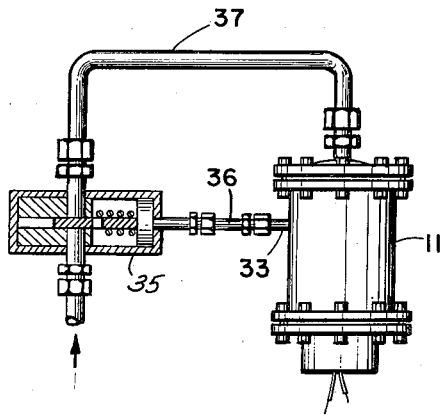
Fig. 4 shows a system connected with a rocket motor according to our invention by which the flow of propellant fluids through the motor is controlled from the pressure within the motor chamber.

To insure maximum safety the flow of propellant into the reaction chamber should not begin until the chamber has been heated sufficiently and the pressure therein has been raised to such a degree that the decomposition of the propellant will readily occur. For this purpose an arrangement similar to that in Fig. 4 may be employed.

In this illustration the flow of the propellant, such as nitromethane (from a storage tank, not shown), is controlled by a shutoff valve 35 which prevents the flow of nitromethane in the conduits until the pressure within the reaction chamber 11 is sufficiently high to cause the shutoff valve 35 to open. The pressure in the reaction chamber is communicated to valve 35 through a line 36 attached to pressure tap 33. There is a correlation between temperature and pressure in the reaction chamber; and temperature and pressure both rise together. The valve is set so that it will open it at a pressure corresponding to a high enough temperature to insure ignition of the propellant.

In operation the squib 29 is set off by closing the electrical circuit. This ignites the black powder charge which initiates the combustion of the self-combustible charge 28. When charge 28 is burned the pressure within the reaction chamber 11 is raised sufficiently to cause the shut-off valve 35 to open and at the same time the temperature within the reaction chamber is raised to a degree high enough to insure the decomposition of the propellant as it flows into the reaction chamber from annulus 23 through orifices 24.

Nitromethane does not spontaneously ignite or decompose at ordinary temperatures, but it will vaporize when its temperature is raised, and it decomposes spontaneously when the temperature is raised as high as about 500° F. To insure positive ignition or decomposition of the nitromethane, the temperature of the chamber should be raised to about 1000° F., as this will insure that when the streams of nitromethane are injected into the chamber through the injector orifices, it will immediately decompose without any accumulation of the nitromethane liquid. When the nitromethane is introduced into the chamber and burns or decomposes, it creates gas generation in addition to that created by the decomposition of the solid charge 28. Care should accordingly be taken that the rate of liberation of gases due to the charge 28 and to the nitromethane do not become excessive, otherwise the gases will build up faster than they can escape through the exhaust nozzle, and the pressure may become dangerously high.

Figure 5:
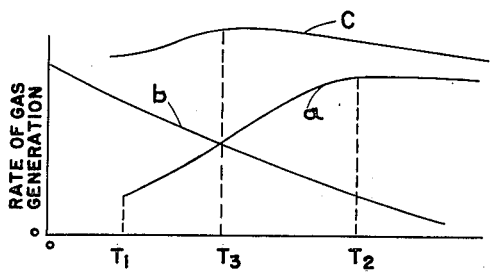
Fig. 5 is a graphical representation showing the rate of gas generation plotted against time.

When the nitromethane ignites, the amount of gas liberation rises fairly uniformly to a constant value. When the nitromethane gas liberation rate is thus rising, it is desirable that the gas liberation rate due to the charge 28 shall correspondingly fall. The desired relationship is illustrated in Fig. 5, which shows graphically the condition which is desired. In Fig. 5, the abscissas represent time from the moment of ignition of charge 28 and the ordinants represent rate of gas generation. Curve $a$ represents the gas generation due to the nitromethane. It is seen that at a time $t_1$ when the nitromethane begins to flow, its gas generation rate is relatively low and increases fairly uniformly to a time $t_2$ after which it becomes fairly uniform. In order that the over-all pressure in the chamber shall not have any very sharp peak, it is desired that the rate of gas generation due to the charge 28 shall vary according to curve $b$. From curve $b$, it will be seen that the rate of gas generation due to the charge should be highest when it is first ignited at zero time, and decrease rather regularly until it finally ceases burning after time $t_2$ when the nitromethane is burning uniformly. Curve $c$, then, shows the over-all variation of gas generation in the chamber during this starting period, and it shows that at time $t_1$ after the nitromethane is injected, following the ignition of charge 28, the pressure rises somewhat and may be allowed to increase slightly to only a slight peak at time $t_3$ after which it gradually approaches the steady value of the nitromethane.

In order to provide the rate of burning according to curve $b$, it is desired that the gas generation rate of charge 28 shall not increase with time, but instead shall decrease. This indicates a propellant with a burning surface which decreases with time. The cylindrical form shown in Figs. 1 and 3 is particularly advantageous for this purpose. The reason for this is that burning occurs over the entire surface of the charge, including the outer cylindrical surface and the two circular end surfaces. As the burning progresses, the charge maintains its cylindrical form, but the surface area decreases at the rate to produce an over-all decrease of gas generation according to curve $b$.

In view of the characteristic of the charge of burning on its surface over a substantial period of time, the charge 28 is herein referred to as a "slow-burning charge." This term distinguishes from the relatively fast burning of the initial black powder charge 29.

It will be recognized that by our invention, we have provided a simple, inexpensive method of starting self-combustible liquid propellants such as nitromethane in particular, and which will insure the decomposition of the nitromethane during its starting period. This will insure against the dangerous accumulation of the liquid propellant in the chamber, and will avoid subjecting the apparatus or the operator to the hazards of an explosion.

The starting arrangement is especially applicable in that the starting charge is quickly cleared from the chamber after the admission of the nitromethane, thereby avoiding the possibility of the collection of foreign matter or metallic particles inside the chamber, which might injure the chamber or jam the throat of the exhaust nozzle and thereby cause an explosion.

We claim:
1. Apparatus for starting a nitromethane propelled jet motor having a reaction chamber and an exhaust nozzle, comprising a solid, slow-burning, self-combustible charge in said reaction chamber, said charge being of the type in which burning occurs on its exposed surface, and being characterized by a burning surface which decreases with time during the burning, ignitor means for initiating the burning of the burning surface of said self-combustible charge, a pressure operated shut-off valve for regulating the flow of nitromethane into the reaction chamber, a pressure tap leading from said reaction chamber and a conduit connecting said pressure tap to said shut-off valve.

2. The method of initiating the decomposition of nitromethane injected into the reaction chamber of a jet motor, the decomposition of the nitromethane being characterized by an increasing rate of gas production up to a uniform rate of gas production during the period the nitromethane is being ignited, said method comprising burning a self-combustible charge within the chamber with a decreasing rate of gas production during said period, such that said increasing rate of gas production of the nitromethane is compensated by said decreasing rate of gas production of the charge, whereby the gas production in the chamber during said period is fairly uniform.

3. In combination with a jet motor having a reaction chamber, an exhaust nozzle, a closure enclosing the front end of said chamber, and means at the closure for injecting liquid nitromethane into the chamber, a rod for supporting self-combustible charge within the chamber, said rod protruding axially into the chamber from the closure means, said charge being adherent to said rod and of a texture which will not crack or split while burning, and means in association with said charge for igniting it, said charge being characterized in that it is slow burning and that burning occurs on an exposed surface over a period of time, and that during the time of the burning, the burning surface decreases in area.

4. In combination with a jet motor having a reaction chamber, an exhaust nozzle, and means for injecting liquid nitromethane into the chamber; a cylindrical-shaped self-combustible charge fastened within the chamber, and a supporting rod fixed to the chamber for supporting the charge, said rod being located along the longitudinal axis of the chamber and nozzle, said charge being adherent to its support and of a texture which will not crack or split while burning, and having the characteristic that burning occurs slowly on its exposed surface over a period of time with the burning surface decreasing in area during the period of burning, and igniting means in association with said charge for igniting it.

5. Apparatus for initiating the decomposition of nitromethane in a rocket motor having a reaction chamber and an exhaust nozzle, comprising a self-combustible charge in said chamber with means for initiating the burning of said self-combustible charge, said charge being characterized in that burning occurs slowly on its exposed surface over a period of time and that the burning surface decreases in area during the period of burning, a conduit extending from the chamber, a pressure operable flow control valve connected with the conduit, whereby pressure in the chamber opens said flow control valve to allow fluid to flow through it, and conduit means through said flow control valve from the source of the nitromethane to the chamber, whereby the opening of said flow control valve due to the pressure causes the nitromethane to flow into the chamber where it is ignited due to the high temperature and pressure within the chamber.

6. The method of initiating the decomposition of a self-combustible fluid propellant injected into the reaction chamber of a jet motor, the propellant being characterized by an increasing rate of gas production up to a uniform rate of gas production during the period it is being ignited, said method comprising burning a self-combustible charge within the chamber with a decreasing rate of gas production during said period, such that said increasing rate of gas production of the propellant is compensated by said decreasing rate of gas production of the charge, whereby the gas production in the chamber during said period is fairly uniform.

References Cited in the file of this patent

UNITED STATES PATENTS

| | | |
|---|---|---|
| 455,278 | Cunningham | June 30, 1891 |
| 1,879,186 | Goddard | Sept. 27, 1932 |
| 1,897,092 | Weir | Feb. 14, 1933 |
| 2,433,943 | Zwicky et al. | Jan. 6, 1948 |
| 2,434,652 | Hickman | Mar. 11, 1944 |
| 2,470,564 | Lawrence et al. | May 17, 1949 |